(12) United States Patent
Ge et al.

(10) Patent No.: US 9,348,632 B2
(45) Date of Patent: May 24, 2016

(54) DATA ASSIGNMENT AND DATA SCHEDULING FOR PHYSICAL MACHINES IN A VIRTUAL MACHINE ENVIRONMENT

(71) Applicant: International Business Machines Corporation, Armonk, NY (US)

(72) Inventors: Yi Ge, Beijing (CN); Li Li, Beijing (CN); Liang Liu, Beijing (CN); Ju Wei Shi, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/491,072

(22) Filed: Sep. 19, 2014

(65) Prior Publication Data

US 2015/0095910 A1 Apr. 2, 2015

(30) Foreign Application Priority Data

Sep. 29, 2013 (CN) .......................... 2013 1 0454953

(51) Int. Cl.
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/505* (2013.01); *G06F 9/5077* (2013.01); *G06F 2009/45575* (2013.01); *G06F 2209/548* (2013.01)

(58) Field of Classification Search
CPC . G06F 9/4881; G06F 9/5683; G06F 9/94553; G06F 9/94558
USPC ............................................. 718/1, 100–107
See application file for complete search history.

(56) References Cited

U.S. PATENT DOCUMENTS

| | | | | |
|---|---|---|---|---|
| 4,969,092 A | * | 11/1990 | Shorter ................. | G06F 9/5077 709/229 |
| 6,076,174 A | * | 6/2000 | Freund .................. | G06F 9/5072 709/225 |
| 6,714,961 B1 | * | 3/2004 | Holmberg ............. | G06F 9/3842 712/23 |
| 6,766,515 B1 | * | 7/2004 | Bitar ..................... | G06F 9/4843 712/228 |
| 7,065,764 B1 | * | 6/2006 | Prael ..................... | G06F 9/5072 703/2 |
| 7,206,805 B1 | * | 4/2007 | McLaughlin, Jr. ...... | G06F 9/466 707/999.01 |
| 7,412,702 B1 | * | 8/2008 | Nelson .................. | G06F 9/4401 703/20 |
| 7,870,551 B2 | * | 1/2011 | Anand .................. | G06F 9/5033 718/1 |
| 8,214,838 B2 | * | 7/2012 | Cherkasova .......... | G06F 9/5077 709/226 |
| 8,261,268 B1 | | 9/2012 | Forgette | |

(Continued)

FOREIGN PATENT DOCUMENTS

CN 101986661 A 3/2011

OTHER PUBLICATIONS

Liao et al, "Software Techniques to Improve Virtualized I/O Performance on Multi-Core Systems", ACM, pp. 161-170, 2008.*

(Continued)

*Primary Examiner* — Anil Khatri
(74) *Attorney, Agent, or Firm* — Cantor Colburn LLP; Keivan Razavi

(57) ABSTRACT

A data assignment method for a physical machine having multiple virtual machines (VMs) running thereon includes receiving data to be processed from a scheduler for assigning job data; storing the received data to be processed into a single queue; and in response to an idle VM being among the multiple VMs, assigning data in the queue to the idle VM to be processed by the idle VM.

14 Claims, 9 Drawing Sheets

(56) References Cited

U.S. PATENT DOCUMENTS

| | | | | |
|---|---|---|---|---|
| 8,381,213 | B1 * | 2/2013 | Naamad | G06F 12/0862 718/100 |
| 8,458,712 | B2 * | 6/2013 | Chan | G06F 9/4881 718/103 |
| 8,473,594 | B2 * | 6/2013 | Astete | G06F 9/45533 709/223 |
| 8,533,724 | B1 * | 9/2013 | Theimer | G06F 9/5077 718/1 |
| 8,589,932 | B2 * | 11/2013 | Bower, III | G06F 9/5094 713/300 |
| 8,612,791 | B2 * | 12/2013 | Wakrat | G06F 1/3225 713/300 |
| 8,635,615 | B2 * | 1/2014 | Chiang | G06F 9/5077 718/1 |
| 8,776,067 | B1 * | 7/2014 | Yancey | G06Q 30/00 707/705 |
| 8,826,271 | B2 * | 9/2014 | Hussain | 718/1 |
| 8,869,164 | B2 * | 10/2014 | Bobroff | G06F 9/505 718/1 |
| 8,910,153 | B2 * | 12/2014 | Gupta | G06F 9/5077 718/1 |
| 2011/0035752 | A1 | 2/2011 | Krishnakumar et al. | |
| 2013/0024872 | A1 | 1/2013 | Bobroff et al. | |

OTHER PUBLICATIONS

Coffman et al, "Feedback Queueing Models for Time-Shared Systems", Journal of the Assoeiation for Computing Machinery, vol. 15, No. 4, pp. 549-576, 1968.*
Liu et al, "FEAS: A full-time event aware scheduler for improving responsiveness of virtual machines", ACM, pp. 3-10, 2012.*
Weng et al, "The Hybrid Scheduling Framework for Virtual Machine Systems", ACM, pp. 111-120, 2009.*
Kim et al, "Task-aware Virtual Machine Scheduling for I/O Performance", ACM, pp. 101-110, 2009.*
Masrur et al, "Designing VM Schedulers for Embedded Real-Time Applications", ACM, pp. 29-38, 2011.*
Min et al, "Delay-Constrained Scheduling for Providing Guaranteed QoS in a Virtual Machine Environment", ACM, pp. 468-469, 2015.*
Yoginath et al, "Optimized Hypervisor Scheduler for Parallel Discrete Event Simulations on Virtual Machine Platforms", ACM, pp. 1-9, 2013.*

* cited by examiner

DATA ASSIGNMENT AND DATA SCHEDULING FOR PHYSICAL MACHINES IN A VIRTUAL MACHINE ENVIRONMENT

This application claims priority to Chinese Patent Application No. 201310454953.0, filed Sep. 29, 2013, and all the benefits accruing therefrom under 35 U.S.C. §119, the contents of which in its entirety are herein incorporated by reference.

BACKGROUND

The present invention relates to a data processing field, and more specifically, to a data assignment method and data assignment apparatus for a physical machine in the data processing field.

With the development of virtualization techniques, it is common to run multiple virtual machines (VMs) on a same physical machine (PM) simultaneously. Sharing hardware resources of a PM and operating in coordination with each other by these VMs may not only increase hardware capacity of the PM, but also enable independent data processes in various VMs without mutual effects, and thereby work efficiency of the PM can be improved significantly.

Current common virtualization techniques comprise Xen, KVM (Kernel Virtual Machine), etc. Taking Xen as an example, U+1 VMs Dom 0, Dom 1, Dom 2, . . . , Dom U may simultaneously run on a PM A. VM Dom 0 acts as a control VM, capable of recognizing which one of VMs Dom 1 to Dom U data received by PM A belongs to. Each of Dom 1 to Dom U has its own queue. Dom 0 stores data in the queue of Dom i (i is an integer from 1 to U) for the processing of Dom i. For example, Dom 0 assigns data of Dom 1 to Dom 1 by storing data to be assigned to Dom 1 into a reference storage page Page 1 corresponding to Dom 1, and then switching data in Page 1 and data in a VM storage page Page 1' corresponding to Dom 1. Similarly, data assigned to each of Dom 2 to Dom U is stored in its respective queue. Thus, each of Dom 1 to Dom U may run in parallel by fetching data from its respective queue.

However, since data handled in the process of handling data of a job by each VM may correspond to a task with a different complexity contained in the job (a job may comprise several tasks), even though each VM has the same amount of data to be processed, the processing times of various VMs may be different due to different operation and computation complexities corresponding to different data sets. For example, as to a certain MapReduce load, due to different processing times of multiple VMs for handling the same amount of data on a single PM, 97% of tasks may be accomplished within one hour, remaining some tasks that might require a considerable long period of time to be accomplished, for example more than 10 hours.

Due to different data processing times of different VMs on the PM, there may be a situation in which some VMs on the PM have completed their data processes while other VMs are still in data handling processes, causing a long waiting state of some VMs on the PM, and thus PM resources cannot be sufficiently utilized and processing efficiency of the PM may be affected.

SUMMARY

According to one aspect of the present invention, there is provided a data assignment method for a physical machine, the physical machine having multiple virtual machines (VMs) running thereon, the method comprising: receiving data to be processed from a scheduler for assigning job data; storing the received data to be processed into a single queue; and in response to an idle VM being among the multiple VMs, assigning data in the queue to the idle VM to be processed by the idle VM.

According to another aspect of the present invention, there is provided a data assignment apparatus for a physical machine, the physical machine having multiple virtual machines (VMs) running thereon, the apparatus comprising: a receiving component, configured to receive data to be processed from a scheduler for assigning job data; a storage component configured to store the received data to be processed into a single queue; and an assignment component configured to assign, in response to an idle VM being among the multiple VMs, data in the queue to the idle VM to be processed by the idle VM.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
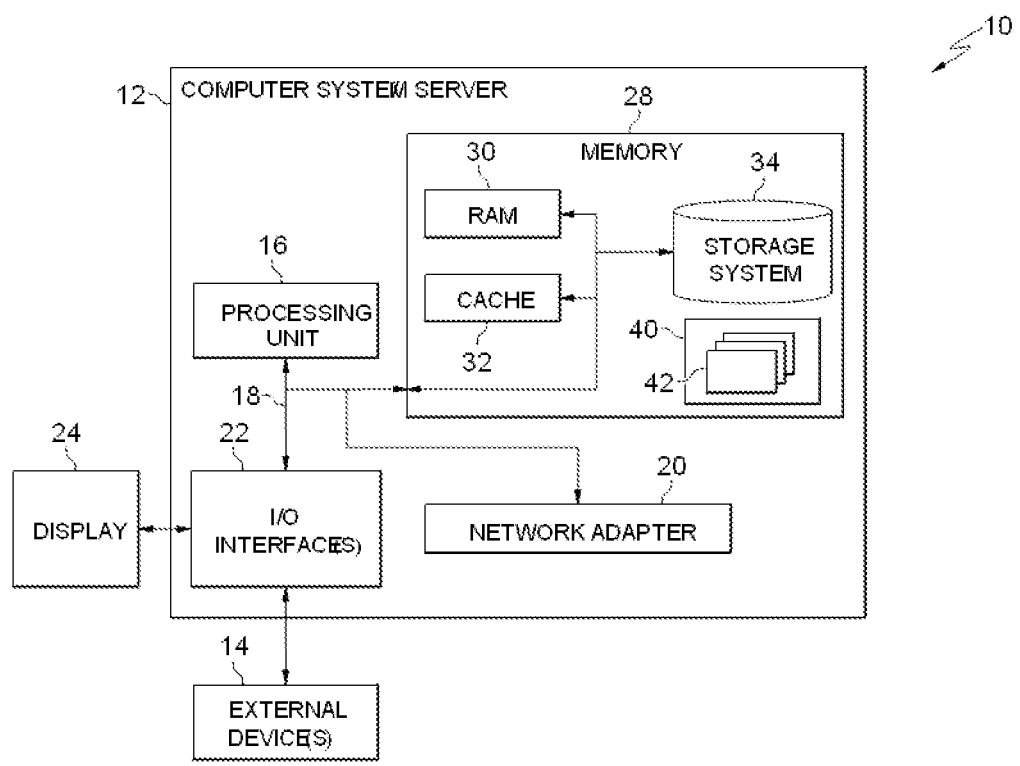
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
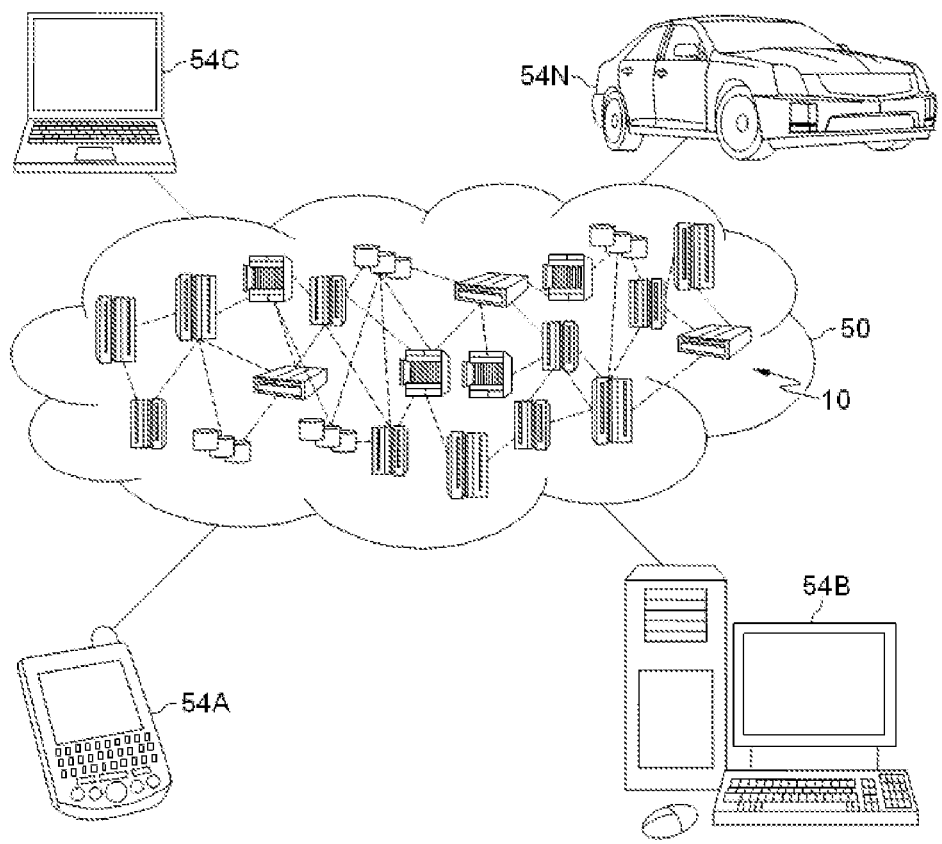
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
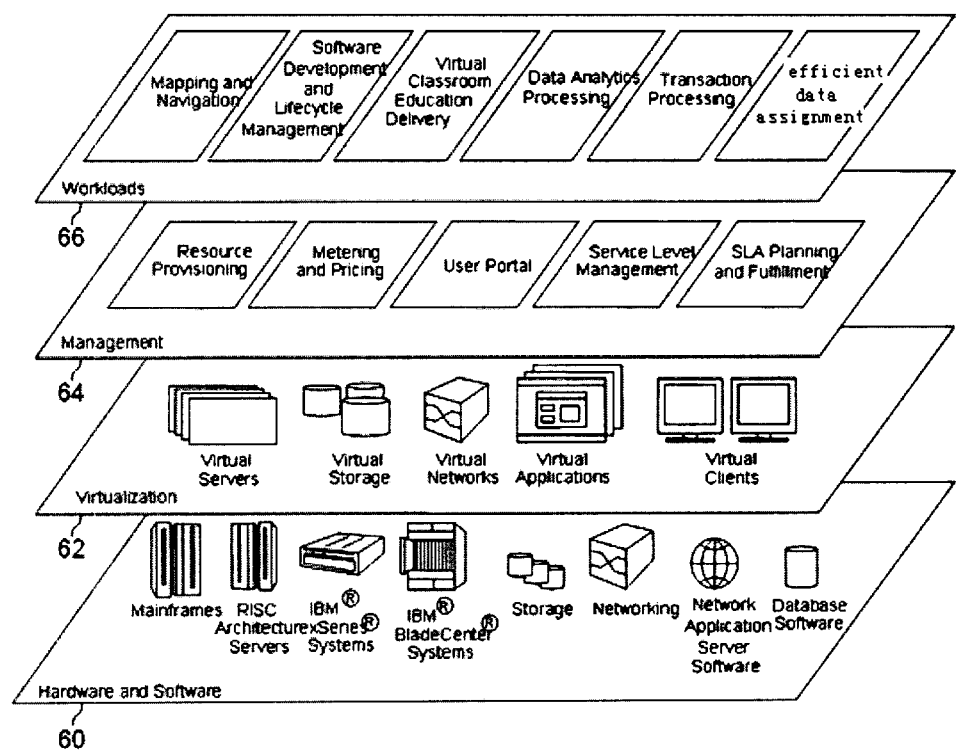
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and efficient data assignment.

A data assignment method and data assignment apparatus for a physical machine is provided in embodiments of this invention, capable of preventing idle VMs from waiting for a long time, and thereby capable of utilizing resources of a single physical machine sufficiently and improving processing efficiency of the single physical machine.

Figure 4:
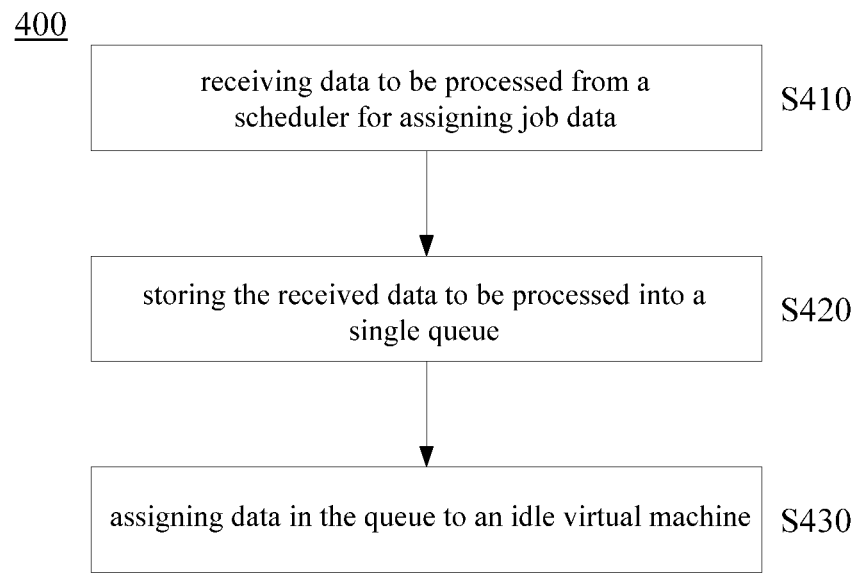
FIG. 4 is a flowchart of a data assignment method for a physical machine according to an embodiment of this invention.

With reference now to FIG. 4, a flowchart of a data assignment method 400 for a physical machine according to an embodiment of this invention will be described. The method 400 may be implemented by a physical machine, which may be the cloud computing node 10 of FIG. 2, for example. The physical machine of this disclosure may support virtualization technologies, on which multiple VMs may run simultaneously.

As shown in FIG. 4, the method 400 comprises: at S410, receiving data to be processed from a scheduler for assigning job data; at S420, storing the received data to be processed into a single queue; and at S430, in response to a presence of an idle VM among the multiple VMs, assigning data in the queue to the idle VM to be process by the idle VM.

For example, when processing a job (for example, a MapReduce job) in a distributed computing network (for example, a cloud network), a scheduler for assigning job data may assign data to be processed to different physical machines in the distributed computing environment. Each time the scheduler may assign different parts of the job data to different physical machines for processing in a distribution manner. When there is a free physical machine (i.e., all VMs on the physical machine have completed their data processes), the scheduler may go on with assigning new data to be processed to the free physical machine.

Instead of distinguishing data for different VMs as in the prior art, and storing data of different VMs in different queues of respective VMs, a physical machine which receives the data to be processed stores the received data in a single queue. In doing so, multiple VMs running on the physical machine may share the single queue set in the physical machine, fetching data respectively from the queue to process. Thus, a VM which has completed its data processing before others may continue to fetch new data to be processed from the queue, and thus the situation of some VMs in waiting and some VMs in computing processes on the same physical machine may be prevented, enabling sufficient utilization of resources of the physical machine, shortened data processing time and improved processing efficiency of the physical machine.

According to an embodiment of this invention, the received data to be processed may be stored in the single queue in the unit of a predetermined reference storage page. Thus, when it is required to fetch data from the queue, data read may be performed in the unit of the reference storage page also, for example, reading an integral number of reference storage pages each time. Storing and reading data in the unit of the reference storage page may realize compatibility with existing virtualization techniques and improve the efficiency of data transmission.

The predetermined reference storage page may be a reference storage page specified in a virtualization technique, or a data size unit specified by a user, by which data reading is performed by the VMs. For example, the reference storage page may be a page capable of storing 64 KB data. The physical machine may divide data to be processed received from the scheduler in the unit of 64 KB and deliver 64 KB data to the queue each time.

In the case of accessing data in the unit of a reference storage page, the size of data to be processed received by the physical machine from the scheduler needs to be an integral multiple of the reference storage page, so as to enable the physical machine to put data to be processed in the queue in the form of a page completely when handling data to be processed by the physical machine each time. In addition, because a physical machine usually needs to process data represented in the form of data records, in order to prevent each data processing from containing an uncompleted data record, and therefore influencing a normal data processing, an integral number of reference storage pages assigned to the VM each time may be caused to include complete data records. That is to say, different parts of a data record may not be distributed to different VMs.

Certainly, in addition to accessing data by a reference storage page, there are also many other data accessing methods available. For example, the physical machine may store in serial data to be processed into a single queue that is shared by multiple VMs, and a predetermined amount of data may be fetched out from the queue for data process when a certain VM is free.

According to an embodiment of this invention, only data to be processed specific to a predetermined application is stored in the single queue. At this point, the queue is a queue corresponding to the predetermined application to prevent mixing up data of different applications and influencing data process of the predetermined application. Specifically, because the multiple VMs on the physical machine may support multiple applications at the same time (for example, a MapReduce based data statistic application, a data filter application based on other programming language/platform, etc.), a queue may be provided for a certain specific application to store data specific to the application collectively and successively for the process of different VMs, so that data process efficiency may be improved for that application, and mutual effects of data among different applications may be prevented.

In this situation, first of all, data to be processed received at S410 may be parsed, and data to be processed specific to the predetermined application that is determined after the parsing is stored in the single queue at S420. Specifically, for example, an application to which data to be processed belongs to may be identified by analyzing the data structure of the data to be processed or packet head information of data packets. Data of a predetermined application concerned by the physical machine (a MapReduce based application, for example) is stored in the queue, and data of other applications may be directly transmitted to VMs for process according to the existing process methods.

According to an embodiment of this invention, in addition to providing a single queue shared by multiple VMs internal to a physical machine, the scheduler may be caused to dynamically assign data to be processed to the physical machine according to processing capability of the physical machine. Thereby, the size of job data received by the physical machine each time from the scheduler may dynamically vary according to its processing capability.

Specifically, in the prior art, the scheduler statically assigns data to be processed of a constant size to a physical machine according to a predetermined system configuration parameter regardless of the processing capability of the physical machine. In contrast, in the embodiment of this invention, when the physical machine has completed the process of the currently received data to be processed, the physical machine may report information indicating the data throughput of the physical machine to the scheduler according to data sizes and processing times of multiple VMs running thereon, so that the scheduler will send data to be processed in a size based on the information to the physical machine next time. Thus, if the physical machine has a fast data process speed, i.e., if the physical machine has a large data throughput (or bandwidth), the scheduler may assign more data to the physical machine next time; in contrast, if the physical machine has a slow data process speed, i.e., the physical machine has a small throughput (or bandwidth), the scheduler may assign less data to the physical machine next time.

For example, assume the scheduler attempts to assign job data in the size of 150M to physical machines PM1, PM2 and PM3. Initially, the scheduler assigns 10M data to physical machines PM1, PM2 and PM3 respectively. There are three VMs VM1, VM2 and VM3 on physical machine PM1, which process 10M data received by physical machine PM1. First, at time t0, PM1 assigns data of 2M, 2M and 2M to these three VMs respectively. At t0+10 s, VM2 completes its process of the 2M data before others, and PM1 continuously assigns 2M new data to VM2. At t0+15 s, VM1 completes its process of the 2M data, and PM1 assigns 2M new data to VM1 accordingly. At t0+20 s, all VMs complete their processes. At that point, physical machine PM1 may send information indicating its data throughput 10M/20 s=0.5 Mbps to the scheduler, based on which the scheduler assign new data to be processed with a certain size to PM1. In addition, in the same way as PM1, PM2 and PM3 may report information indicating their respective data throughputs to the scheduler according to their respective sizes of data processed and process times when their data processes complete. Herein, assume the throughput PM2 reports to the scheduler is 1 Mbps, and PM3 reports a throughput of 1.5 Mbps to the scheduler. The scheduler assigns new data prepared to be assigned to these physical machines next time (such as, 60M data) to these physical machines according to the proportion relationship among the data throughputs of PM1, PM2 and PM3, causing various physical machines to process data in different sizes according to their respective data process capabilities, thereby enabling different physical machines to complete their data processes almost at the same time, and then the overall time for processing the job may be shortened accordingly. For example, PM1 may be assigned with 60M*0.5/(0.5+1+1.5) data, PM2 may be assigned with 60M*1/(0.5+1+1.5) data, and PM3 may be assigned with 60M*1.5/(0.5+1+1.5) data. After PM1, PM2 and PM3 complete the processes of these new data to be processed, they may go on with reporting their respective data throughput information to enable the scheduler to adjust the size of data to be assigned to each of these VMs next time dynamically according to the new reported information.

It can be seen from the above description, the size of data assigned to the physical machine by the scheduler for the first time may be a predetermined size. The predetermined size may be set in advance, or may be calculated according to data sizes of different jobs. For example, the size of data assigned to a single physical machine by the scheduler may be determined by the scheduler according to the number of physical machines for executing a job, the data size of the job and a predetermined ratio. For example, assume five physical machines take part in the execution of a job, the data size of the job is 1 G, and the predetermined ratio is 10%, the scheduler may assign 1 G*0.1/5=20M data to each of these five physical machines. Certainly, the initial data sizes assigned to each physical machine may be different with each other. These initial data sizes assigned to each physical machine are used for exploring processing capability of each of them (the processing capability may be represented by data throughput).

After the first data assignment to a physical machine, the physical machine's current data processing capability may be explored. Then, the size of data to be assigned to the physical machine for the second time may be adjusted according to the physical machine's data processing capability determined from the first data process. After the second data process, a new current data processing capability of the physical machine may be explored, and thereby the size of data to be assigned to the physical machine for the third time may be adjusted according to the physical machine's data processing capability determined from the second data process; and so on. Thus, the scheduler may dynamically assign data to be processed next time to the physical machine by monitoring processing capability reflected by the physical machine upon the completion of each data process, to enable various physical machines to process data sizes appropriate to their processing capabilities, so that various physical machines may complete their data processes substantially at the same time. Thus, the situation of some busy physical machines and some free physical machines due to static data assignment to physical machines according to a predetermined parameter configuration may be avoided, thus various physical machines may be utilized efficiently and job processing time may be shortened.

Although it has been described above that various physical machines directly report data throughputs to the scheduler, it is also possible for various physical machines to report total times they spent on processing their assigned data to the scheduler, or report total times they spent along with data sizes they processed to the scheduler, or report data sizes processed by its various VMs and respective processing times. No manner which method the physical machine adopts to report information, it is applicable so long as the physical machine's data throughput may be determined by the scheduler from the information reported by the physical machine.

Figure 5:
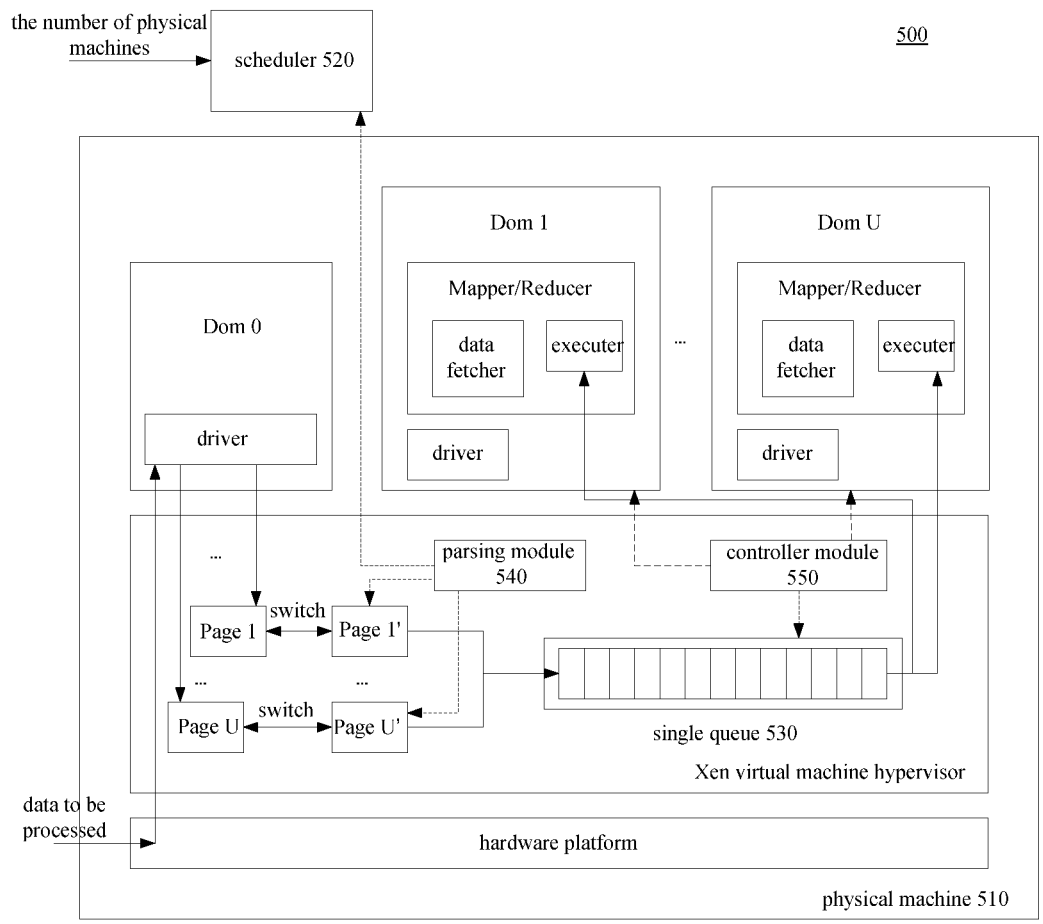
FIG. 5 is a schematic diagram of an example of a system configuration for implementing the data assignment method according to the embodiment of this invention.

Below, the data assignment method 400 will be described in detail in conjunction with an exemplary configuration of a system 500 shown in FIG. 5. In FIG. 5, an example is described in which Xen is taken as the virtualization technique adopted by the physical machine. After reading this description, those skilled in the art can easily understand a method of implementing efficient data assignment when adopting another virtualization technique. In the case of adopting another virtualization technique, the VM configuration may be different from that shown in FIG. 5 (for example, there may be no control VM and all are data processing VMs, instead.). By fetching data to process from the same single queue by VMs for data processing, the physical machine's overall processing time may be shortened.

In FIG. 5, a physical machine 510 and a scheduler 520 for assigning job data to the physical machine 510 in a distributed computing network are shown. A Xen VM hypervisor supporting the Xen virtualization technique runs on the hardware platform of the physical machine to manage multiple VMs running simultaneously, which are referred to as Dom 0 to Dom U. Among these VMs, Dom 0 has a function of control, for dividing data received by the physical machine 510 and transmitting data according to a reference storage page specified by Xen. Dom 1 to Dom U perform data processes on various application jobs, including a MapReduce job. Herein, in order to optimize the physical machine's processes for data of a MapReduce job, a single queue 530 which is shared by Dom 1 to Dom U is provided for MapReduce. In addition, only VM processes for MapReduce are focused in the following description, and VM processes for other applications may be performed in a manner similar to that in the prior art, or in a manner similar to the processes for the MapReduce application. Although one physical machine 510 is shown in FIG. 5, the scheduler 520 may also assign job data to other physical machines, which may have the same configuration as that of the physical machine 510.

Because each VM needs to process a MapReduce job, each VM may function as a Mapper/Reducer. Each Mapper/Reducer comprises a data fetcher and an executer. The data fetcher may control at which time data contained in a page initially corresponding to the Mapper/Reducer (one of Page 1' to Page U') is delivered to the queue 530. The executer may process data assigned to the Mapper/Reducer. Each VM may further comprise a driver. These drivers may also control when corresponding pages Page 1' to Page U' are delivered to the queue 530. In the embodiment of this invention, the timing of delivering corresponding pages Page 1' to Page U' to the queue 530 may be controlled by the data fetcher or the drivers; also, one of a parsing module 540 and a controller module 550 described later may be used to control when pages Page 1' to Page U' are delivered to the queue 530. Certainly, it is also possible to deliver pages having data thereon to the queue 530 according to a constant time sequence, without the dynamical control of other module.

Because there may be not a necessary binding relationship between data to be processed by VMs and various VMs, different VMs Dom 1 to Dom U may equally process data specific to a same job (such as a MapReduce job) received by the physical machine 510, and thus these data can be stored in a single queue 530 provided in the physical machine. The queue 530 may be a memory block allocated from the memory, cache, or RAM of the physical machine, for storing data to be processed by VMs Dom 1 to Dom U.

After the physical machine 510 receives data to be processed from the scheduler 520, the data may be stored in the single queue in the unit of the reference storage page specified by Xen. Specifically, as shown in FIG. 5, data received by the physical machine 510 may be delivered to Dom 0. A driver in Dom 0 may divide and store the data into different pages Page 1 to Page U according to the reference storage page specified by Xen. Then, data switch is performed between Page 1 to Page U and Page 1' to Page U' initially belonging to VMs Dom 1 to Dom U, respectively.

Because the queue 530 needs to store data for a MapReduce process, the parsing module 540 in the Xen VM hypervisor may parse data in pages Page 1' to Page U' to determine which data is MapReduce data. Then, Page 1' to Page U' having MapReduce data stored therein are delivered to the queue 530.

Although pages Page 1 to Page U and Page 1' to Page U' are described herein, the specific meaning of these pages in the related field may not impact the implementation of embodiments of this invention, so long as data to be processed may be stored in the queue 530. Performing data switch by the reference storage page herein may ensure the compatibility with existing virtualization techniques, preventing significant effects caused by introducing a lot of changes in existing systems, and thus enabling the implementation of embodiments of this invention in existing systems in a simpler way.

In the case of having data to be processed in the queue 530, the controller module 550 in the Xen VM hypervisor may detect whether there is any idle VM among VMs Dom 1 to Dom U, and assign data, from the queue 530 in a first in first out manner, to the detected idle VM in the unit of the reference storage page. For example, when Dom 1 is free, the controller module 550 may assign an integral number of reference storage pages (for example, three) from the beginning of the queue 530 to Dom 1 to be processed by Dom 1.

In the case of delivering data to be processed to the queue 530 in the unit of the reference storage page Space, the data size VLP assigned to an idle VM by the controller module 550 each time may represent the size of data that can be processed by the VM in a data fetch cycle. More specifically, in MapReduce, VLP may represent a data size that can be processed by the Mapper of a VM in one data fetch cycle.

According to the embodiment of this invention, VLP needs to satisfy two conditions at the same time. One is that VLP needs to be P times of Spage, wherein Spage is the size of the VM hypervisor page, P is a configurable integer, and different integral multiples P may be set for different VMs. Each integral multiple P for a VM may be changed or unchanged during processing a same job data. Another condition is that VLP has to comprise a complete data record, i.e., it is not acceptable for a data record to be partially located in a VLP and partially in another VLP.

The data assigned by the controller module 550 to the idle VM may be processed by the executer of the VM. In addition to monitor whether there is any idle VM to assign data from the queue 530, the controller module 550 may further monitor times spent by the VMs to complete their data processes to calculate a data throughput of the physical machine. Certainly, it is also possible to monitor times spent by various VMs to complete their data processes by the parsing module 540 to calculate a data throughput of the physical machine. In the example of FIG. 5, one of the parsing module 540 and the controller module 550 may collect information about the physical machine's data throughput. Note that, although the parsing module 540 and the controller module 550 are divided separately in FIG. 5, these two modules may be the same module or may be subdivided into even more sub-modules.

Figure 6:
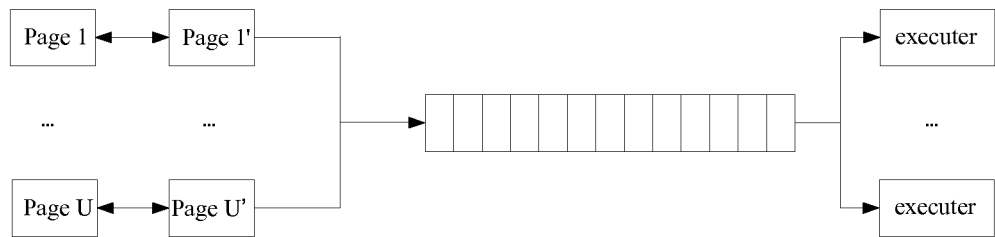
FIG. 6 is a schematic diagram of a single-queue multiple-window model (also known as single-queue multiple-server) adopted on a single physical machine according to an embodiment of this invention.

The way of data access with a single queue shown in FIG. 5 may be represented in a form shown in FIG. 6. In FIG. 6, data in storage pages Page 1' to Page U' initially specific to VMs Dom 1 to Dom U is collectively stored in the single queue, from which these VMs fetch page data to process by their executers. Thus, a single-queue multiple-window (multiple-server) data access method may be realized.

Figure 7:
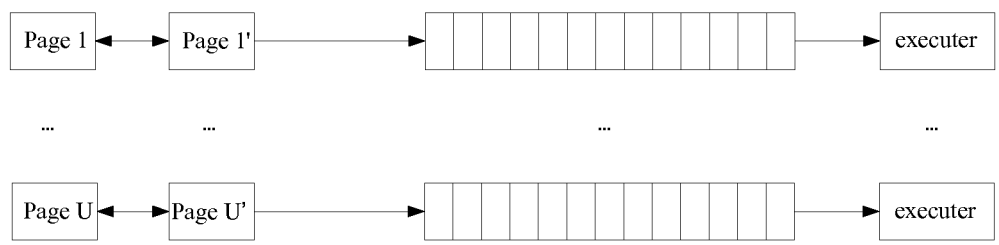
FIG. 7 is a schematic diagram showing a multiple-queue multiple-window model adopted on a single physical machine in the prior art.

In contrast, a multiple-queue multiple-window data access method in the prior art is shown in FIG. 7. Data in storage pages Page 1' to Page U' is stored in separate queues of corresponding VMs respectively. The VMs then fetch data from their respective queues to process by their executers.

Comparing FIG. 6 and FIG. 7, it may be recognized clearly that sharing a single queue by multiple VMs may prevent idleness of faster VMs and the waste of system resources, increase overall processing efficiency and speed of the physical machine, and shorten overall processing time of the physical machine.

After the physical machine 510 complete its data process using the single-queue multiple-window method described above, the parsing module 540 (or the controller module 550) may report information indicating the physical machine 510's data throughput to the scheduler 520. The information may directly comprise data throughput data, or data by which the scheduler 520 may calculate the data throughput of the physical machine 510. According to data throughput information collected from all physical machines processing the job, the scheduler 520 may assign data to be processed next time to the physical machine 510 according to the processing speed of the physical machine 510. For example, the scheduler 520 may assign part of a total amount of data to be assigned next time to the physical machine 510 at a ratio equal to the ratio of the data throughput of the physical machine 510 to the summed data throughput of all physical machines used to process the job.

Because the physical machine 510 assigns data to VMs by VLP, the size of data assigned by the scheduler 520 to the physical machine 510 each time may be an integral multiple of VLP to enable various VMs to perform their data processes correctly.

Specifically, in addition to being an integral multiple of VLP, the data size PLPinitial assigned to the physical machine 510 by the scheduler 520 for the first time may further equal to S*step/#PM. Wherein, S is the total data amount of the MapReduce job; step is a configurable fraction, representing a ratio of data to be assigned to all physical machines for the distributed process of the MapReduce at the first time to the total data amount of the MapReduce job; #PM represents the number of physical machines used for the distributed process of the MapReduce job. Because #PM is needed when calculating PLPinitial, the value of #PM may be inputted to the scheduler 520.

Certainly, PLPinitial may be a predetermined value also, or a constant value. Further, PLPinitial may be different for each physical machine. The data assigned to various physical machines for the first time is used to explore each physical machine's processing capability for dynamically assigning data next time.

From the second data assignment of the scheduler 520, it may dynamically assign data according to a data throughput of the physical machine during the previous data process. The data size PLPi to be assigned by the scheduler 520 to the physical machine 510 in the i-th assignment (i is an integer larger or equal to 2) may be Si*ti/T. Wherein, Si represents a total data amount prepared to be assigned in the i-th assignment, Si may be a percentage of S (e.g., 10%, 20%, step, etc.), ti represents a data throughput when the physical machine 510 completes processing data assigned to it in the (i−1)-th assignment of the scheduler 520, and T represents the sum of data throughputs of all physical machines that are used to process the MapReduce job when they complete their processes of data previously assigned by the scheduler 520, and these data throughputs are presently known by the scheduler 520. Similarly, by replacing ti in the expression Si*ti/T with a data throughput of another physical machine in its process of data that is assigned to it by the scheduler 520 in the (i−1)-th assignment, a data size to be assigned to the another physical machine by the scheduler 520 in the i-th assignment may be obtained.

By dynamically adjusting the data size to be assigned to the physical machine next time according to the data throughput in each data process of the physical machine, data assignment may be performed flexibly according to different data processing capabilities of physical machines to take advantage of data processing performances of different physical machines sufficiently, prevent the problem of low efficiency caused by static data assignment, enable different physical machines used to process the same job to complete their data processes substantially at the same time, and shorten job process time.

Figure 8:
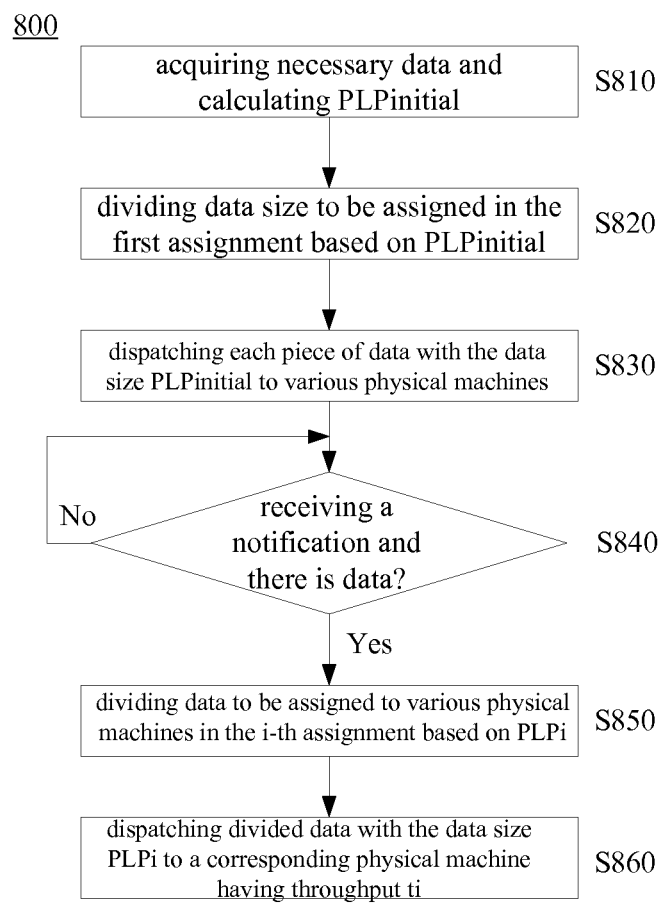
FIG. 8 is a flowchart showing a method of assigning job data to a physical machine implemented on a scheduler side according to an embodiment of this invention.

Next, a flowchart of a dynamical data assignment method 800 performed on the scheduler 520 side in the system 500 will be described with reference to FIG. 8.

The scheduler 520 is responsible to assign data to be processed to various physical machines used to perform a MapReduce job. The data assignment process of the scheduler 520 comprises an initial static assignment process and subsequent dynamic assignment processes based on data throughput. In the initial data assignment of the scheduler 520, the scheduler 520 performs static partition on data to be assigned in the first assignment and then assign them to various physical machines. In the subsequent data assignments of the scheduler 520, the scheduler 520 may dynamically partition data to be assigned in that assignment according to various physical machines' data throughput obtained in the previous data process to adjust data sizes assigned to the various physical machines, and thus having faster physical machines process more data, and slow physical machines process less data, thereby shortening the overall process time of the MapReduce job and improving the processing speed.

Blocks S810 to S830 correspond to the initial data assignment phase performed by the scheduler 520.

At block S810, the scheduler 520 acquires necessary data and calculates PLPinitial. The necessary data acquired by the scheduler 520 comprises the number of physical machines processing the MapReduce job. PLPinitial assigned to each physical machine is calculated following S*step/#PM above. Block S810, however, is not a necessary step. For example, PLPinitial may be set to a constant value without any calculation.

At block S820, the scheduler 520 divides a data size S*step to be assigned in the first assignment based on PLPinitial. That is to say, at block S820 the scheduler 520 divides data to be assigned in the first assignment into #PM equally sized pieces, wherein the data size of each piece is PLPinitial.

At block S830, the scheduler 520 dispatches each piece of data in the size of PLPinitial to each individual physical machine to be processed by the physical machine. From the perspective of the scheduler 520, it does not need to take consideration of VMs as the prior art, with only a consideration of assigning a certain amount of data to an idle physical machine.

Blocks 5840 to 5860 correspond to the dynamic data assignment phase performed by the scheduler 520.

At decision block 5840, the scheduler 520 determines whether a notification of data process completion is received from a physical machine, and whether there is any unallocated data to be processed. Data throughput information related to a currently completed data process of the physical machine is comprised in the notification. If the scheduler 520 receives a notification from a physical machine and there is still unallocated data to be processed, the method 800 proceeds to block 5850. It the scheduler 520 does not receive a notification from a physical machine and there is any unallocated data to be processed, the method continues to wait at block 5840. If the scheduler 520 determines there is no remaining data to be processed, the method 800 ends.

At block 5850, the scheduler 520 determines a total amount Si of data to be assigned to various physical machines in the i-th assignment, calculates PLPi using Si*ti/T described above, and divides job data with the data size Si based on PLPi.

At block 5860, the scheduler 520 dispatches data with the data size PLPi to a corresponding physical machine having a throughput ti.

Figure 9:
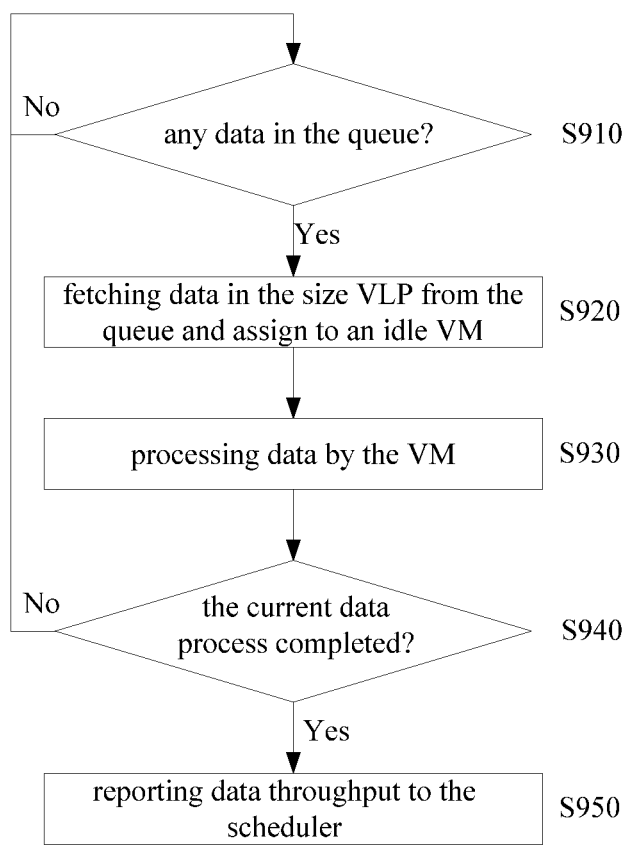
FIG. 9 is a flowchart showing a data processing method implemented on the VM side according to an embodiment of this invention.

FIG. 9 shows a flowchart of a data processing method 900 that is performed on the side of Mapper/Reducer VMs DOM 1 to DOM U in the system 500.

At decision block S910, the controller module 550 detects whether there is data in the queue 530. If there is data in the queue 530, the method 900 proceeds to block S920. If there is no data in the queue 530, the controller module 550 continues to detect the queue 530.

At block S920, in response to the presence of an idle VM, the controller module 550 fetches data with the size VLP from the queue 530 and assigns the data to the VM.

At block S930, the VM performs a data process through Mapper/Reducer.

The processes from blocks S910 to S930 may be executed simultaneously on different threads, enabling different VMs to process data from the queue 530 simultaneously.

At decision block S940, the Xen VM hypervisor determines whether the process of all the data currently received by the physical machine 510 has been completed, that is, whether a current process period has been finished. If not all data has been processed, the method 900 returns to decision block S910.

If the current data process period has been finished, at block S950, a data throughput corresponding to the current data process period is reported to the scheduler 520 through the controller module 550 or the parsing module 540 to enable the scheduler 520 to assign an appropriate size of data to the physical machine 510 according to the data throughput next time, such that the overall job process time can be shortened by dynamic data assignment by the scheduler, and the process speed can be improved.

According to the data assignment method of the embodiment of this invention, a performance superior to that of the existing multiple-queue multiple window model may be realized by adopting a single-queue multiple-window model, the time of data processing on a single physical machine may be shortened, and resource waste caused by idle VMs in a waiting state may be prevented. By dynamically assigning data to be processed according to various physical machines' data throughput or bandwidths, the data processing capabilities of various physical machines may be utilized sufficiently, with increased overall job processing speed, and improved processing efficiency. Further, because data access is performed in the unit of a reference storage page, only fewer changes in existing virtualization techniques are needed, allowing convenient implementations. Further, when applying the method of the embodiment of this invention to the MapReduce framework, only fewer impacts on the method and time sequence of data processing under the MapReduce framework are needed, and thereby allowing convenient implementations.

The data assignment method according to the embodiments of this invention has been described above. Below a structural block diagram of a data assignment apparatus according to an embodiment of this invention will be described with reference to FIG. 10 and FIG. 11. The data assignment apparatus in FIG. 10 and FIG. 11 may be incorporated into a software module of a single physical machine, its hardware module or a combination thereof, to implement the data assignment method according to an embodiment of this invention.

Figure 10:
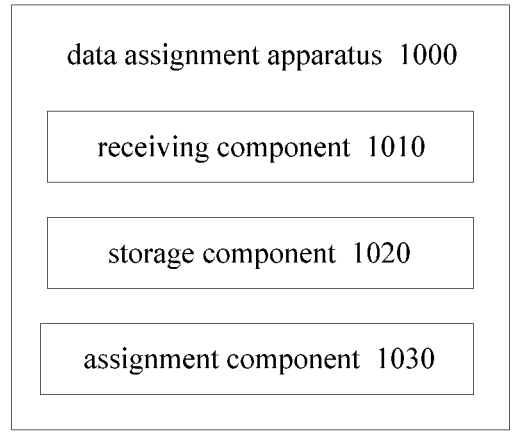
FIG. 10 is a structural block diagram showing a data assignment apparatus used for a physical machine according to an embodiment of this invention.

As shown in FIG. 10, the data assignment apparatus 1000 for a physical machine comprises a receiving component 1010, a storage component 1020 and an assignment component 1030, wherein multiple VMs run on the physical machine. The receiving component 1010 may be configured to receive data to be processed from a scheduler for assigning job data. The storage component 1020 is configured to store the received data to be processed into a single queue. The assignment component 1030 is configured to assign, in response to there is an idle VM among the multiple VMs, data in the queue to the idle VM to be processed by the idle VM.

Reference may be made to the above description of FIG. 4 for the above and other operations and/or functions of the receiving component 1010, the storage component 1020 and the assignment component 1030, which will not be repeated to avoid repetitions.

The data processing apparatus according to the embodiment of this invention may avoid the situation of some VMs in a processing procedure and some VMs in a waiting state on a same physical machine, and thus enabling sufficient utilization of the physical machine's resources, shortening data processing time of the physical machine, and improving processing efficiency. Because of the shortened processing time of the physical machine, it is advantageous for the physical machine to request new data to be processed faster, and further beneficial to the completion of the whole job, and shorten the job processing time.

Figure 11:
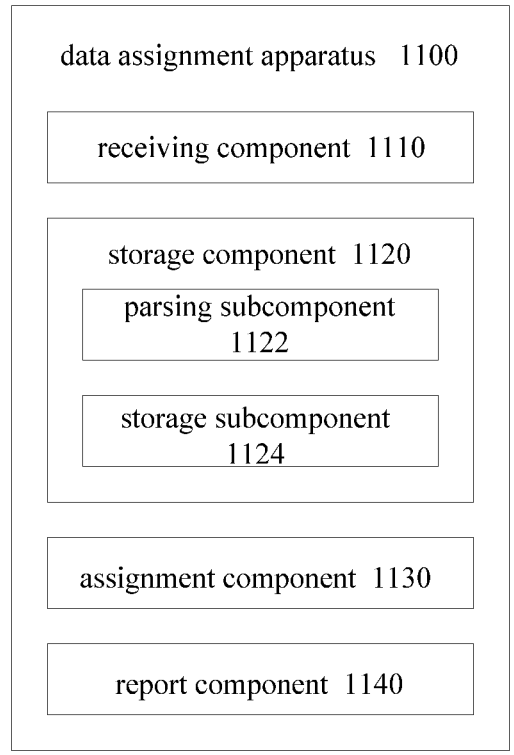
FIG. 11 is another structural block diagram showing a data assignment apparatus used for a physical machine according to an embodiment of this invention.

As shown in FIG. 11, a receiving component 1110, a storage component 1120 and an assignment component 1130 of the data assignment apparatus 1100 are substantially the same as the receiving component 1010, the storage component 1020 and the assignment component 1030 of the data assignment apparatus 1000, respectively.

According to an embodiment of this invention, the apparatus 1100 may further comprise a report component 1140. The report component 1140 may be configured to report, in response to the processing of the data to be processed is completed, according to the data size processed by the multiple VMs and their processing times, information indicating the physical machine's data throughput to the scheduler, to enable the scheduler to assign data to be processed with a size based on that information to the physical machine next time.

According to an embodiment of this invention, the size of data to be assigned to the physical machine next time may correspond to a percentage of job data to be assigned by the scheduler next time, the percentage being equal to a ratio of the data throughput of the physical machine to the sum of data throughputs of all physical machines used to process the job.

According to an embodiment of this invention, in the case of receiving data to be processed from the scheduler for the first time, the size of the received data to be processed may be determined based on the number of physical machines used to process the job, the data amount of the job, and a predetermined ratio by the scheduler.

According to an embodiment of this invention, the storage component 1120 may be specifically configured to store the received data to be processed into the single queue in the unit of a predetermined reference storage, and the assignment component 1130 may be specifically configured to assign an integral number of reference storage pages in the queue to the idle VM.

According to an embodiment of this invention, the size of data to be processed that is received from the scheduler is an integral multiple of the reference storage page.

According to an embodiment of this invention, the storage component 1120 may further comprise a parsing subcomponent 1122 and a storage subcomponent 1124. The parsing subcomponent 1122 may be configured to parse the received data to be processed. The storage subcomponent 1124 may be configured to store data to be processed, which is determined as specific to a predetermined application after the parsing, into the single queue.

According to an embodiment of this invention, the predetermined application may be a MapReduce based application.

Reference may be made to the above corresponding description of FIG. 4 to FIG. 6 and FIG. 8 to FIG. 9 for the above and other operations and/or functions of the above various components and subcomponents, which will not be repeated to avoid repetitions.

The data assignment apparatus according to the embodiments of this invention can realize a performance superior to that of the existing multiple-queue multiple window model by adopting a single-queue multiple-window model, the time of data processing on a single physical machine may be shortened, and resource waste caused by idle VMs in a waiting state may be prevented. By dynamically assigning data to be processed according to various physical machines' data throughput or bandwidths, the data processing capabilities of various physical machines may be utilized sufficiently, with increased overall job processing speed, and improved processing efficiency. Further, because data access is performed in the unit of a reference storage page, only fewer changes in existing virtualization techniques are needed, allowing convenient implementations. Further, when applying the method of the embodiment of this invention to the MapReduce framework, only fewer impacts on the method and time sequence of data processing under the MapReduce framework are needed, and thereby allowing convenient implementations.

According to the above technical solutions, by providing a single queue for multiple VMs on the physical machine, once an idle VM is available, data may be fetched from the single queue and provided to the idle VM for processing. As compared to providing different queues for different VMs in the prior art, the method of sharing a single queue by multiple VMs may utilize various VMs more efficiently, and prevent VMs from being in a waiting state and thus wasting PM resources. Thus, when there is still data to be processed on the physical machine, all VMs on the physical machine may be kept in running, so that physical machine resources may be utilized sufficiently, processing efficiency of the physical machine may be improved, and processing time as a whole may be shortened for data to be processed on the physical machine. Due to the shortened processing time of the physical machine, it is advantageous for the physical machine to request new data to be processed faster, and further beneficial to the completion of the whole job, and shorten job processing time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data assignment method for a physical machine, the physical machine having multiple virtual machines running thereon, the method comprising:
   receiving, by a processor executing on a computing device, data to be processed from a scheduler configured to assign job data;
   storing, by the processor, the received data to be processed into a single queue,
   wherein the single queue is shared by the multiple virtual machines running on the physical machine; and
   in response to an idle virtual machine being among the multiple virtual machines, assigning, by the processor, data in the queue to the idle virtual machine to be processed by the idle virtual machine;
   wherein storing the received data to be processed into a single queue comprises:
   parsing the received data to be processed; and s
   storing data to be processed, which is determined as specific to a predetermined application after the parsing, into the single queue.

2. The method according to claim 1, further comprising:
   in response to the processing of the data to be processed being completed, according to the data size processed by the multiple virtual machines and their processing times, reporting information indicating the physical machine's data throughput to the scheduler, to enable the scheduler to assign data at to be processed at a next time with a size based on that information to the physical machine.

3. The method according to claim 2, wherein the size of data to be assigned to the physical machine at the next time corresponds to a percentage of job data to be assigned by the scheduler at the next time, the percentage being equal to a ratio of the data throughput of the physical machine to the sum of data throughputs of all physical machines used to process the job.

4. The method according to claim 2, wherein in the case of receiving data to be processed from the scheduler for a first time, the size of the received data to be processed is determined based on the number of physical machines used to process the job, the data amount of the job, and a predetermined ratio by the scheduler.

5. The method according to claim 1, wherein storing the received data to be processed into a single queue comprises:
   storing the received data to be processed into the single queue in the unit of a predetermined reference storage page; and
   assigning data in the queue to the idle virtual machine comprises assigning an integral number of reference storage pages in the queue to the idle virtual machine.

6. The method according to claim 5, wherein the size of data to be processed that is received from the scheduler is an integral multiple of the reference storage page.

7. The method according to claim 1, wherein the predetermined application is a MapReduce based application.

8. An apparatus comprising: a processor in communication with one or more types of memory, the processor configured to initiate a receiving component, a storage component, and an assignment component;
   the receiving component, configured to receive data to be processed from a scheduler for assigning job data;
   the storage component configured to store the received data to be processed into a single queue,
   wherein the single queue is shared by the multiple virtual machines running on the physical machine; and
   the assignment component configured to assign, in response to an idle virtual machine being among the multiple virtual machines, data in the queue to the idle virtual machine to be processed by the idle virtual machine;
   wherein the storage component comprises:
   a parsing subcomponent, configured to parse the received data to be processed; and
   a storage subcomponent, configured to store data to be processed, which is determined as specific to a predetermined application after the parsing, into the single queue.

9. The apparatus according to claim 8, further comprising:
   a report component, configured to report, in response to the processing of the data to be processed is completed, according to the data size processed by the multiple virtual machines and their processing times, information indicating the physical machine's data throughput to the scheduler, to enable the scheduler to assign data to be processed with a size based on that information to the physical machine next time.

10. The apparatus according to claim 9, wherein the size of data to be assigned to the physical machine next time corresponds to a percentage of job data to be assigned by the scheduler next time, the percentage being equal to a ratio of the data throughput of the physical machine to the sum of data throughputs of all physical machines used to process the job.

11. The apparatus according to claim 9, wherein in the case of receiving data to be processed from the scheduler for the first time, the size of the received data to be processed is determined based on the number of physical machines used to process the job, the data amount of the job, and a predetermined ratio by the scheduler.

12. The apparatus according to claim 8, wherein,
the storage component is configured to store the received data to be processed into the single queue in the unit of a predetermined reference storage page;
the assignment component is configured to assign an integral number of reference storage pages in the queue to the idle virtual machine.

13. The apparatus according to claim 12, wherein the size of data to be processed that is received from the scheduler is an integral multiple of the reference storage page.

14. The apparatus according to claim 8, wherein the predetermined application is a MapReduce based application.

* * * * *